United States Patent
Hu et al.

(10) Patent No.: US 10,650,030 B2
(45) Date of Patent: May 12, 2020

(54) METHOD AND SYSTEM TO ALIGN TWO CODING STANDARDS

(71) Applicant: Fujitsu Limited, Kawasaki-shi, Kanagawa (JP)

(72) Inventors: Bo Hu, Winchester (GB); Aisha Naseer Butt, Hayes Middlesex (GB); Jesus Garcia Salinas, London (GB)

(73) Assignee: FUJITSU LIMITED, Kawasaki (JP)

( * ) Notice: Subject to any disclaimer, the term of this patent is extended or adjusted under 35 U.S.C. 154(b) by 465 days.

(21) Appl. No.: 15/474,360

(22) Filed: Mar. 30, 2017

(65) Prior Publication Data
US 2017/0344623 A1    Nov. 30, 2017

(30) Foreign Application Priority Data

May 31, 2016   (DE) .................. 10 2016 209 492
May 31, 2016   (GB) ................... 1609520.0
Dec. 13, 2016  (EP) ................... 16203859

(51) Int. Cl.
*G06F 7/00*    (2006.01)
*G06F 17/30*   (2006.01)
(Continued)

(52) U.S. Cl.
CPC ...... *G06F 16/285* (2019.01); *G06F 16/24578* (2019.01); *G06F 16/907* (2019.01)

(58) Field of Classification Search
None
See application file for complete search history.

(56) References Cited

U.S. PATENT DOCUMENTS

| 8,452,773 B1 | 5/2013 | Young |
| 2005/0091200 A1 | 4/2005 | Melton et al. |

(Continued)

OTHER PUBLICATIONS

Extended European Search Report dated Jun. 23, 2017 in European Patent Application No. 16203859.0.
(Continued)

*Primary Examiner* — Tuan A Pham
(74) *Attorney, Agent, or Firm* — Staas & Halsey LLP

(57) ABSTRACT

A system to align codes between two coding standards, including: an expert mapping module, a syntactical mapping module, and a case-based mapping module; a module adjustment unit or system; and an alignment unit or system; where the expert mapping module collects established mappings between pairs of codes of the two coding standards from the internet and/or from machine-readable publications; the syntactical mapping module accesses the two coding standards including descriptions for each code, and to find the similarity of pairs of codes of the two coding standards using the descriptions to provide syntactical mappings; the case-based mapping module accesses existing cases that are annotated with both coding standards and to find case-based mappings between pairs of codes of the two coding standards; the module adjustment unit aggregates the mappings from the modules; and the alignment unit accepts input of codes from one of the coding standards and to use the aggregated mappings from the module adjustment unit to extract one or more suitable mappings from each input code to a code of the other coding standard.

14 Claims, 8 Drawing Sheets

(51) Int. Cl.
  *G06F 16/28* (2019.01)
  *G06F 16/2457* (2019.01)
  *G06F 16/907* (2019.01)

(56) References Cited

U.S. PATENT DOCUMENTS

| | | |
|---|---|---|
| 2010/0274821 A1 | 10/2010 | Bernstein et al. |
| 2011/0231373 A1 | 9/2011 | Rohan et al. |
| 2013/0086069 A1* | 4/2013 | Phillips .................. G06Q 10/06 707/737 |
| 2013/0311475 A1 | 11/2013 | Emanuel |
| 2014/0372148 A1* | 12/2014 | Reddy .................... G06F 19/328 705/3 |
| 2015/0074147 A1 | 3/2015 | Musgrove |
| 2015/0095016 A1 | 4/2015 | Karres et al. |
| 2015/0103921 A1* | 4/2015 | Hannuksela ......... H04N 19/152 375/240.26 |
| 2015/0103926 A1* | 4/2015 | Hannuksela ......... H04N 19/119 375/240.26 |
| 2015/0242571 A1 | 8/2015 | Naeymi-Rad et al. |

OTHER PUBLICATIONS

Domenico Beneventano, "A Web Service Based Framework for the Semantic Mapping Amongst Product Classification Schemas", Journal of Electronic Commerce Research, vol. 5, No. 2, 2004, pp. 114-127*.

HealthFusion, Inc. "The ICD-9 to ICD-10 Crosswalk made Easy: ICD-10 Code Lookup", 2016, 1 page.

UK Office Communication dated Nov. 9, 2016 in Application No. GB1609520.0.

Partial English Translation of German Search Report dated Nov. 4, 2016 in German Application No. P128407DE00.

* cited by examiner

METHOD AND SYSTEM TO ALIGN TWO CODING STANDARDS

CROSS-REFERENCE TO RELATED APPLICATIONS

This application claims the benefit of German Application No. 102016209492.0, filed May 31, 2016, in the German Intellectual Property Office, United Kingdom Application No. 1609520.0, filed May 31, 2016, in the United Kingdom Intellectual Property Office, and European Application No. 16203859.0, filed Dec. 13, 2016, in the European Patent Office, the disclosures of which are incorporated herein by reference.

BACKGROUND

The embodiments relate to coding standards, for example coding standards which classify entities in a complex hierarchical system for ease of reference. Such standards may refer to technical domains such as for example: diseases, drugs, products, services, natural phenomena, transport, research areas and production systems, to name but a few examples. There are many coding standards in existence, and often two or more apply to the same domain. These may be competing standards, and/or one may supersede the other. Alignment of two such standards has multiple applications in today's data-rich world for exporting facts between computer systems, for consumption by human experts or for updating databases.

One example is of the competing classifications for goods and services which co-exist. eCl@ss is currently the only ISO/IEC (International Organization for Standardization/International Electrotechnical Commission) compliant industry standard nationally and internationally. With its 41,000 product classes and about 17,000 properties, eCl@ss covers the majority of traded goods and services. Many industry standards (e.g. from the electronic industry, medical technology, construction engineering, paper industry/office technology) are looking for interoperability to realize the potentials of a cross-industry standard and eCl@ss is claimed to provide such interoperability.

A competing classification is UNSPSC (United Nations Standard Products and Services Code®) managed by GS1 US™ for the UN Development Programme (UNDP). UNSPSC is an open, global, multi-sector standard for efficient, accurate classification of products and services. It includes a five level hierarchical classification codeset, and enables expenditure analysis at different grouping levels. You can drill down or up to the codeset to see more or less detail as is necessary for business analysis.

Other coding systems include the European Union Common Procurement Vocabulary (CPV), developed to facilitate the processing of invitations to tender published in the Official Journal of the European Union (OJEU) by means of a single classification system to describe the subject matter of public contracts; and GS1 (Global Standards One), which provides standards used in barcoding.

It would be useful to cross-reference these standards for products/services, especially where each standard is conceived separately and there is hence no direct correlation between classes and instances in the standards.

Another example is in the medical domain. Currently, in many clinical institutions, two international disease classification systems are widely used concurrently for historical reasons. For instance, it could be that different departments are in the transition process of migrating to the next version of World Health Organisation International Classification of Disease (ICD) system while there are large amount of legacy patient data still annotated with the old ICD system. The two systems currently in-use are version 9 (ICD9) and ICD10. Since it is likely that the two systems are used to provide diagnostic code to the same patients when they are visiting different departments of the hospital, alignment between ICD9/10 becomes necessary.

The alignment between two classification systems is, however, not straightforward, even if they are designed by the same standards body. For example, ICD10 is not backward compatible with the previous version. For instance, there are no laterality (side of the body) features in the ICD9 codes whereas the ICD10 presents laterality and captures the complexity of diseases in a much better way through the extensive combination codes. Such differences in semantics result in ambiguous alignment between the two versions. For instance, there are cases when an ICD10 code can be mapped to multiple ICD9 codes. Similarly, there are cases when one ICD9 code is refined into multiple ICD10 code for better classification. There are also obsolete ICD classification and newly introduced codes. All these make establishing alignment a difficult task. Other classification/coding standards which develop in the medical area share these difficulties.

It is desirable to align two coding systems referring to the same domain (or to overlapping domains).

SUMMARY

According to an embodiment of a first aspect, there is provided a system to align codes between two coding standards, comprising: an expert mapping module, a syntactical mapping module, and a case-based mapping module; a module adjustment unit or system; and an alignment unit or system; wherein the expert mapping module is configured to collect established mappings between pairs of codes of the two coding standards from the internet and/or from machine-readable publications; the syntactical mapping module is configured to access the two coding standards including descriptions for each code, and to find the similarity of pairs of codes of the two coding standards using the descriptions to provide syntactical mappings; the case-based mapping module is configured to access existing cases that are annotated with both coding standards and to find case-based mappings between pairs of codes of the two coding standards; the module adjustment unit is configured to aggregate the mappings from the modules; and the alignment unit is configured to accept input of codes from one of the coding standards and to use the aggregated mappings from the module adjustment unit to extract one or more suitable mappings from each input code to a code of the other coding standard.

The system may comprise one or more processors to implement the defined modules and/or units and memory to store the mappings between the coding standards (the stored mappings, for example. Including one or more of the established mappings, syntactical mappings, case-based mappings, aggregated mappings and suitable mappings)

A method, a system and a computer program according to embodiments can create alignment between two classification taxonomies (coding standards), by providing mappings between them to equate a code of one standard with one or more codes of the other standard. Embodiments can allow separate mappings to be provided by an expert mapping module, a syntactical mapping module and a case-based mapping module. The mappings from the different modules can be combined (aggregated) together in a module adjustment unit.

The mappings may be suitable in that they are supported by data. According to embodiments, the alignment is established by integrating heterogeneous data sources, each potentially associated with a probability/confidence value. The alignment can then be utilised in annotating items, such as unprocessed records, for instance patient records or records of products or services.

In one preferred embodiment, the coding standards are medical coding standards, and the cases are patient cases. In a different preferred embodiment, the coding standards are standards for products and services and the cases are products/services which have been or are to be classified.

The various modules can give a value to the mappings produced, for example ranging between 0 and 1, where 1 is the highest rating of a mapping indicating absolute certainty that it is correct.

In one example, the expert mapping module is configured to provide a confidence value for an established mapping to reflect one or more different sources which establish the established mapping. That is, an official website from an organisation providing the coding system would have a higher confidence value than an unknown internet site.

In one example, the syntactical mapping module is configured to provide a similarity value for a syntactical mapping to reflect syntactical similarity in the form of string similarity. In another example, the syntactical mapping module is configured to provide a similarity value for a syntactical mapping to reflect syntactical similarity in the form of hierarchical similarity. These similarity values may be used in combination. In any case, similarity valuation may use an ontology to serve as a reference for the descriptions for each code.

The case-based mapping module may be configured to find case-based mappings based on individual cases annotated with both coding standards. The case-based mapping module may be configured to find case-based mappings based on a cohort of cases annotated with both coding standards, the cohort having a defined characteristic of the population of cases, each case being annotated with one of the coding standards. Either or both of these methods may be used.

The case-based mapping module may be configured to provide a probability value for a case-based mapping to reflect a ratio of cases confirming the mapping of a code (from a first of the coding standards to a code of a second of the coding standards) to the total number of cases annotated with the code in the first of the coding standards.

Any or all of the modules can update their mappings from time to time. In one example the expert mapping module and/or the syntactical mapping module and/or the case-based mapping module update produced mappings periodically, preferably when stored metadata differs from external data source metadata. The metadata may be a time stamp and a difference may be said to exist when the time stamps differ by over a threshold amount of time.

The module adjustment unit aggregates the mappings (combines them). It can be configured to accumulate any confidence, similarity and probability values according to any suitable methodology (for example addition and division by 3 if the values are between 0 and 1).

The module adjustment unit is configured to assign a module weight to the mappings from each module. That is, each mapping from a particular module may receive the same module weight. This can be combined with the module mapping values, as follows, using the sigmoid function to eliminate less significant mappings. For example:

$$\text{sim}(a,b) = \Sigma w_i \cdot \text{sig}_i(\text{sim}_i(a,b) - n)$$

where sim(a,b) is the overall similarity between a and b, $w_i$ is a weight for the ith module $\text{sim}_i$ is the value for the mapping (a, b) from the ith module, $\text{sig}_i$ is the sigmoid function giving an output of 0 or 1, and n is a bias for the sigmoid function. Further methods such as rank aggregation can also be applied.

The module weight may be based on end user feedback, preferably from domain experts. Alternatively, the module may be based is based on comparison of individual outputs of the modules to a standard mapping. Weight adjustment can be based on machine learning to increase automation. In this case, the outputs of different modules can be compared against a reference such as user feedback or a list of manually crafted alignment (a standard mapping). Starting with equal weight values, the alignment unit then gradually adjust the individual weights to maximise the fitness of aggregation results against the user feedback or labelled results. This is a typical machine learning approach.

Turning to the alignment module, this part extracts mapping results from the aggregated mappings. For example, the alignment module may be configured to accept an input which requires all the mappings to be used.

The alignment module may be configured to accept input of a single code from a current case to extract one or more suitable mappings to one or more corresponding codes.

If no suitable mappings are found, the alignment module may be configured to search for mappings belonging to previous cases which are similar to the current case and to present codes from the similar previous cases as candidate codes.

Some mappings may not be very strong, even if they have been found by the system. For example they may be erroneous or based on little evidence. Such mappings can be eliminated at the alignment stage using thresholding.

For example, the alignment module may be configured to apply a threshold to any of, or any combination of: a module weight, confidence value, similarity value or probability value of candidate mappings to extract one or more suitable mappings. In one embodiment, for each mapping, the product of the module weight and value is used as an end weighting which is compared with a threshold and/or with other mappings. If the mapping is supported by more than one module, then the end weightings per module are summed and compared to the threshold. If the aggregated weightings from multiple modules are not greater than a predefined threshold, the mapping/alignment may be discarded or given lower priority until others are considered or processed.

According to an embodiment of a second aspect, there is provided a computer-implemented method of aligning codes between two coding standards, comprising: collecting established mappings between pairs of codes of the two coding standards from the internet and/or from machine-readable publications; accessing the two coding standards including descriptions for each code, and finding the similarity of pairs of codes of the two coding standards using the descriptions to provide syntactical mappings; accessing any existing cases that are annotated with both coding standards and finding any case-based mappings between pairs of codes of the two coding standards; aggregating the mappings from each module; and accepting input of a code from one of the coding standards and using the aggregated mappings from the modules to extract one or more suitable mappings from a code of one of the coding standards to a code of the other coding standard.

If there are only a few existing annotated cases, then the case-based mapping module can simply be given a lower weighting.

According to an embodiment of a third aspect, there is provided a computer program which when executed on a computing device carries out a method as described above.

An apparatus or computer program according to preferred embodiments can comprise any combination of the system aspects. Methods or computer programs according to further embodiments can be described as computer-implemented in that they require processing and memory capability.

The apparatus according to preferred embodiments may be described as configured or arranged to, or simply "to" carry out certain functions. This configuration or arrangement could be by use of hardware or middleware or any other suitable system. In preferred embodiments, the configuration or arrangement is by software.

Thus according to one aspect there is provided a program which, when loaded onto at least one computer configures the computer to become the apparatus according to any of the preceding apparatus definitions or any combination thereof.

According to a further aspect there is provided a program which when loaded onto the at least one computer configures the at least one computer to carry out the method steps according to any of the preceding method definitions or any combination thereof.

In general the computer may comprise the elements listed as being configured or arranged to provide the functions defined. For example this computer may include memory, processing, and a network interface.

The embodiments can be implemented in digital electronic circuitry, or in computer hardware, firmware, software, or in combinations of them. The embodiments can be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program can be in the form of a stand-alone program, a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the embodiments can be performed by one or more programmable processors executing a computer program to perform functions by operating on input data and generating output. Apparatus can be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The description is in terms of particular embodiments. Other embodiments are within the scope of the following claims. For example, the steps can be performed in a different order and still achieve desirable results. Multiple test script versions can be edited and invoked as a unit without using object-oriented programming technology; for example, the elements of a script object can be organized in a structured database or a file system, and the operations described as being performed by the script object can be performed by a test control program.

Elements of the embodiments have been described using the terms "module" and "unit", and could equally be described as "means". The skilled person will appreciate that such functional terms and their equivalents may refer to parts of the system that are spatially separate but combine to serve the function defined. Equally, the same physical parts of the system may provide two or more of the functions defined.

For example, separately defined means may be implemented using the same memory and/or processor as appropriate.

Preferred features of the embodiments will now be described, purely by way of example, with references to the accompanying drawings, in which:—

DRAWINGS

DETAILED DESCRIPTION

Figure 1:
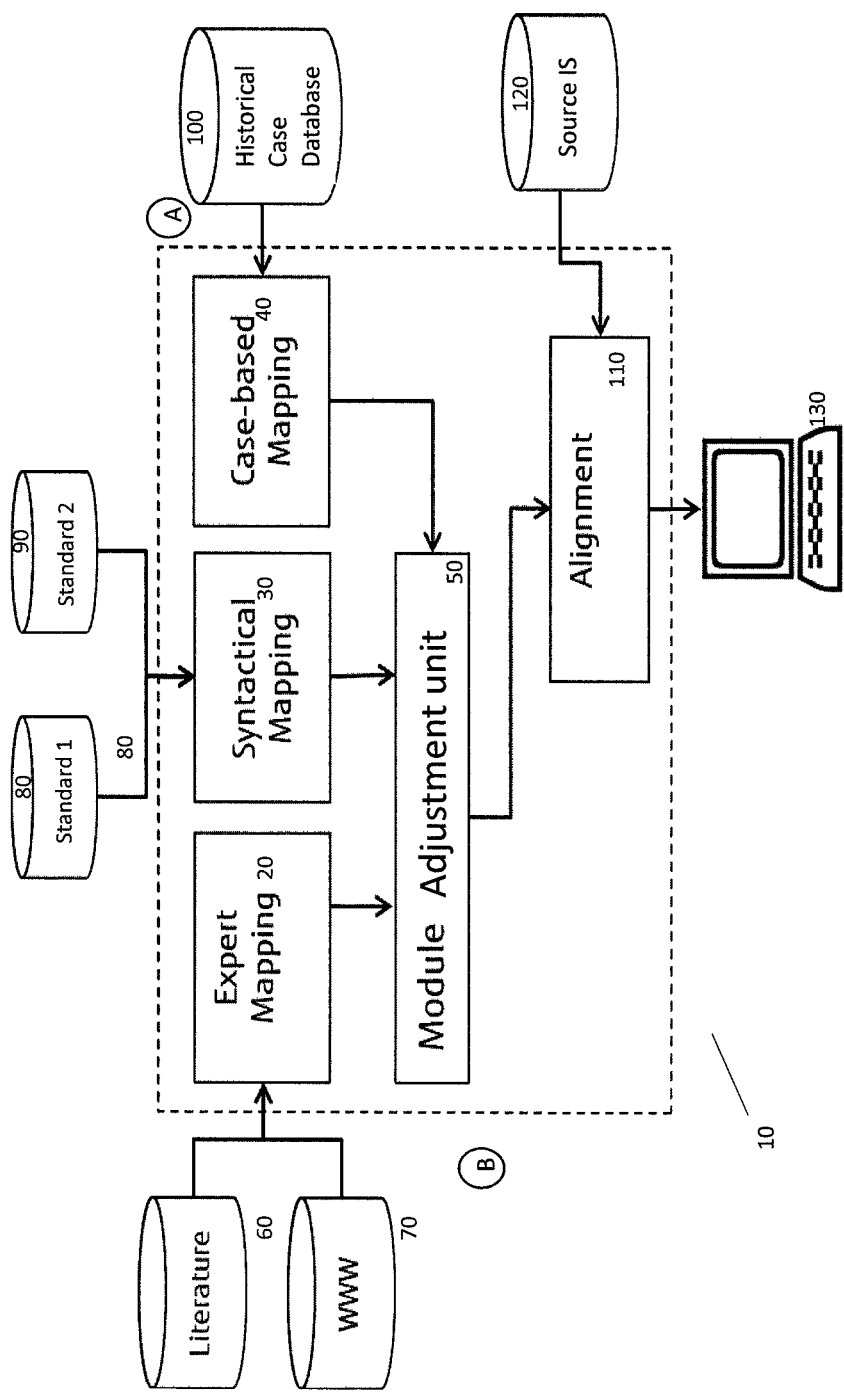
FIG. 1 is a block diagram of main system components in a general embodiment.

FIG. 1 shows system 10 which includes three modules providing mappings from different data sources.

Expert mapping module 20 retrieves mappings from literature 60 and from the internet. For example, for a products and services embodiment, the expert mapping module might refer to sources such as http://www.cmap.eu.

Syntactical mapping 30 retrieves mappings from the classifications 80, 90 themselves. Case-based mapping 40 retrieves mapping from a historical case/records database. For example a database may be provided which includes the same product and its classification in two or more coding systems.

The modules may be run periodically to include new mappings into the system, when computing resource permits, or at predetermined intervals.

In general, a daemon submodule can be provided for each module, to allow data updates "on the fly" (as needed). The daemon submodule periodically collects metadata from a list of selected data sources. It can compare the latest metadata with a local cache to detect the difference, query the external data sources when there is a difference or when the difference (e.g. time elapsed from previous update) is deemed significant, store the newly retrieved mapping data in a local storage, update the local cache and register the new updates. It can also inform other submodules within its own module as well as other modules and/or units of such updates.

All these modules feed results into the module adjustment unit 50 (or system), which aggregates the mappings, for example adding together mappings found from different sources. If values indicating certainty of the mapping are provided, they may be combined to give an overall value when the same mapping is found in different modules. Alternatively, the values may be kept separate. At this stage, the mappings from the 3 different modules may be given a different weight. For instance, in some circumstances previous cases may have been inaccurately labelled, and so the case-based mappings may be given a lower module weight.

In alignment unit 110 (or system), the mappings are extracted as required, either individually or as a block or entire mapping, potentially using thresholding based on module weight and/or the values of the individual mappings to retain only significant mappings, or comparison to retain the single most significant mapping.

An optional link to a source Information System, IS may allow direct comparison of a case (such as a record of a particular product) with other cases to find a mapping between a code in one system associated with the particular product and a code of another standard associated with a similar product in the source information system. Such comparison may take place if the mapping modules do not produce sufficient results.

The historical case database 100 and source information system 120 are shown as separate but may be the same system/database.

130 represents user input via a computer, for example of a code. The input computer may be remote.

Figure 2:
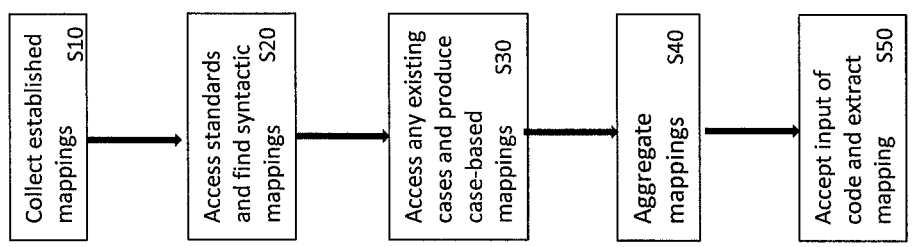
FIG. 2 is a flow chart of a method in a general embodiment.

FIG. 2 describes a general method embodiment. In S10 established mappings are collected, for example from literature/the internet. In S20 the two standards are accessed and syntactic similarity is found to give syntactic mapping. In step S30 existing case date is used to produce case-based mappings. In step S40 these mappings are aggregated. Finally in step S50 mappings are extracted based on one or more input codes.

Figure 3:
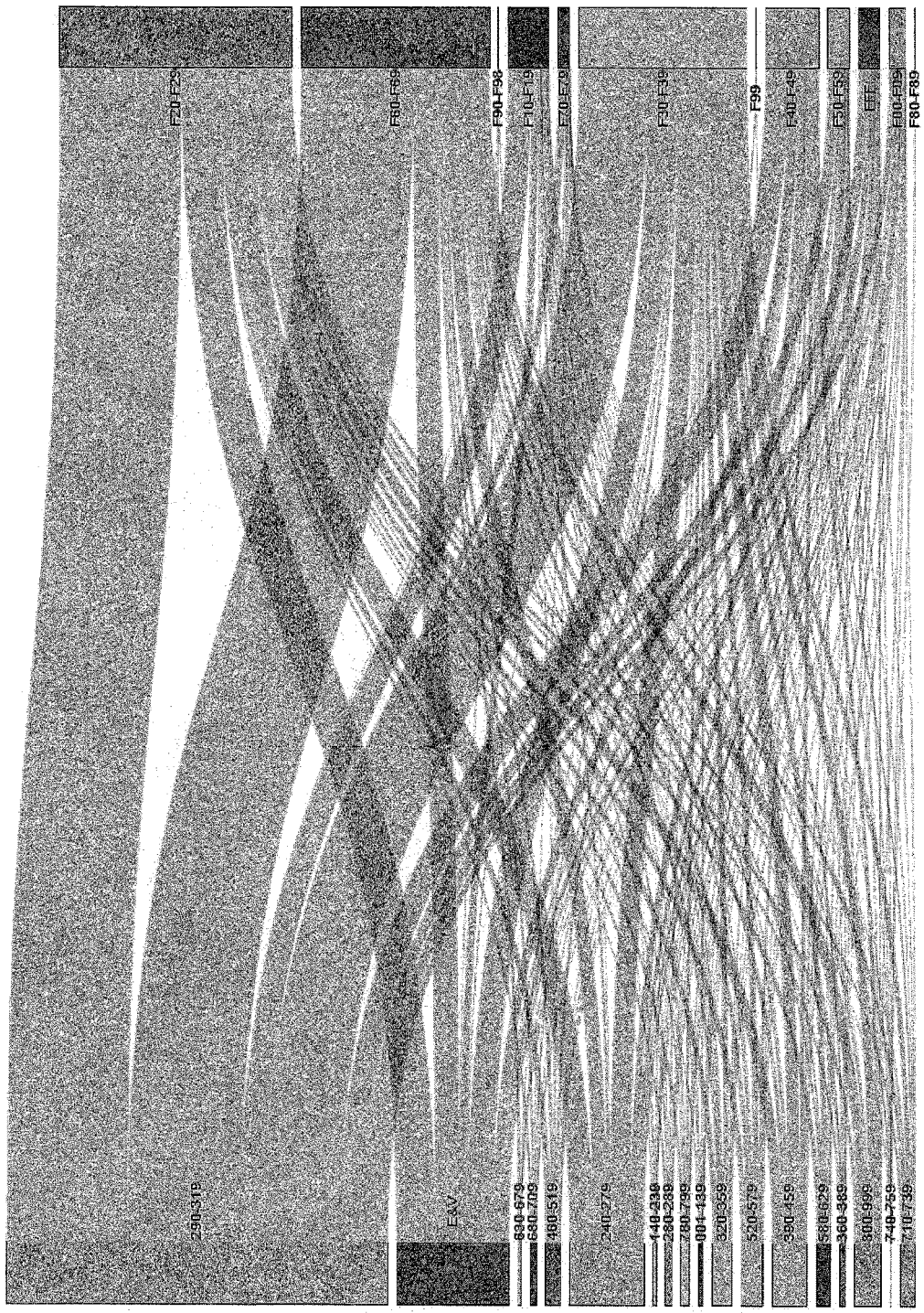
FIG. 3 is a visualisation of an m-m mapping between ICD9 and ICD10 created by an embodiment.

FIG. 3 shows a mapping between a part of ICD9 and a part of ICD10, which has been extracted and displayed. It can be provided as an interactive user interface, which displays part or all of the full mapping between two standards. For example, moving a mouse over a code could highlight the corresponding code(s) in the other coding standard.

Figure 4:
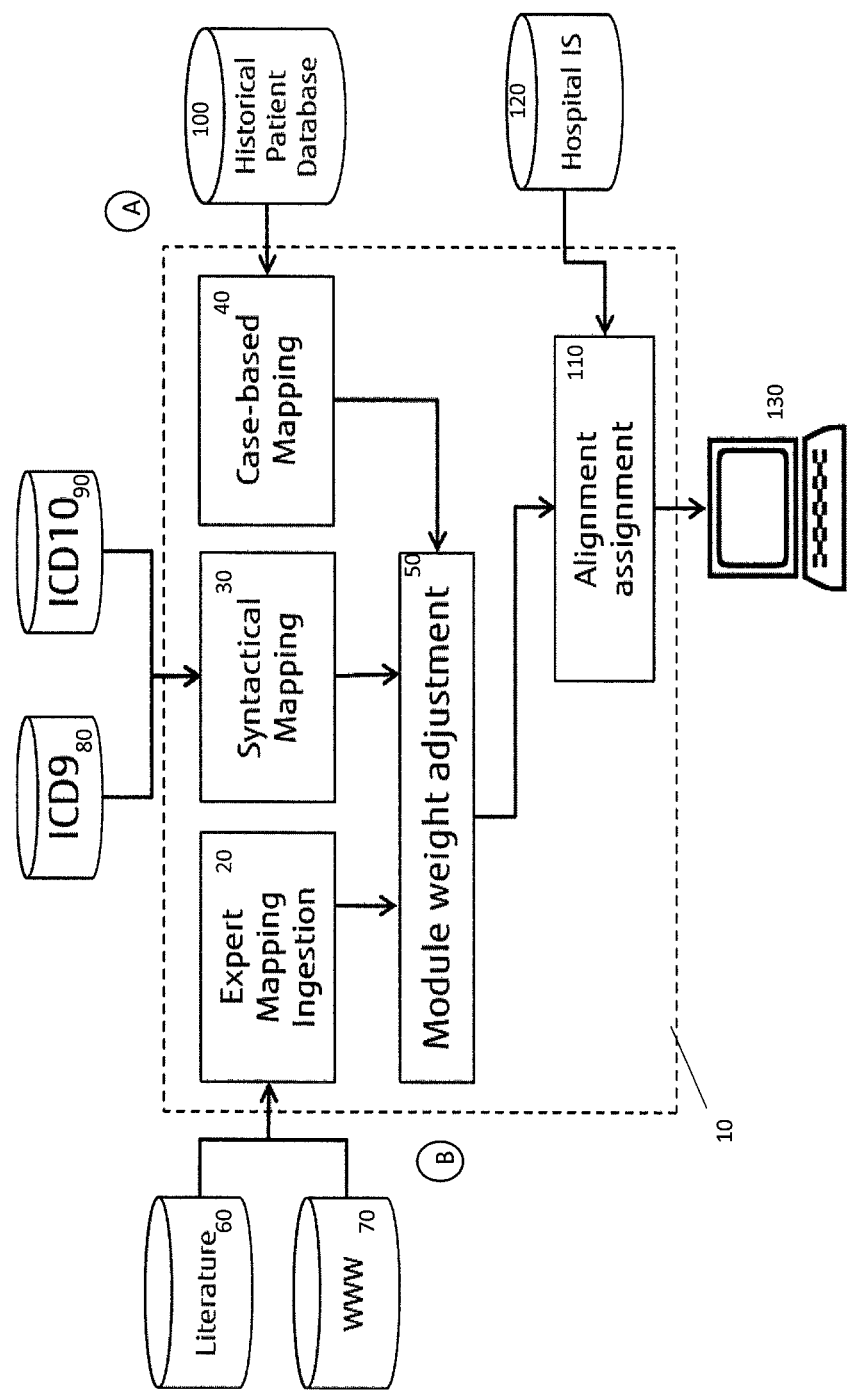
FIG. 4 is a block diagram of main system components in a medical-related embodiment.

The specific embodiment shown in FIG. 4 tries to collect evidence from different sources to provide the most accurate and most up-to-date alignment between two medical classification systems, ICD9 and ICD10. This is taken as a detailed example, and the skilled reader will appreciate that an alignment system for other coding standards will follow essentially the same methodology and have the same structure, with any adaptation necessary for the specific domain.

The system consists of the following components:
- A. An input data processing unit containing three modules: i.e. expert mapping ingestion 20, syntactical mapping 30, and case-based mapping 40 modules.
- B. A weight adjustment module 50 that will learn the weights of different input modules
- C. An alignment assignment module 110 that will prompt the potential ICD10 code to patient cases annotated with ICD9 codes.

Data sources include, on the left: literature 60, and WWW 70, and on the right: historical patient database 100 and hospital information 120. For simplicity, in the figure on page 2, the two data sources on the right can be merged provided as a single data source i.e. the historical patient database and the hospital IS can be a single hospital information system.

Medical Classification Alignment System Details

In general, the system in this embodiment includes a data ingestion module, a weight adjustment module, and an alignment refinement unit, all particularly adapted for the medical domain. The details are as follows.

Data Sources

Like other embodiments, the aim is to collect data from heterogeneous sources, potentially including:
- i. Published medical literature as expert opinions. A publication repository, such as PubMed can be used in mining code alignment. Such results can be associated with confidence values computed based on journal reputation and the fact that whether the publication is peer-reviewed, etc.
- ii. Established medical ontologies. Such ontologies are normally outcomes of large scale international collaboration. They already reflect to some extent an agreement among practitioners in terms of semantics and representation. Though direct mappings/alignments are not necessarily available, such ontology can serve as reference upon which both ICD versions can be projected to infer indirect alignment.
- iii. World Wide Web as a secondary source for expert opinions. There are websites publishing mapping results as the outcomes of either funded or voluntary efforts, with different authorities, that need to be taken into account when the mapping is utilised.
- iv. ICD9 and ICD10 classification systems as input to syntactical mapping computation. Complete coding systems with descriptions are necessary.
- v. Historical patient cases, possibly processed already to present only patient cases that are annotated with both coding systems. This is in the case that multiple coding systems are used simultaneously in one organisation or across multiple organisations but in relation to one single case. This mapping can allow patient cases in one diagnostic coding system being annotated with another coding system.

A. Data Input Unit

The mapping construction module can be further divided into three more dedicated subcomponents, each focused on a particular type of data source. This differentiation is mainly due to the nature of data sources and the required technology to handle such data sources. The sub components are the expert mapping ingestion module, the syntactical mapping module and the case-based mapping module.

The expert mapping ingestion module mainly collects theoretically established mapping from existing literature or from the internet ((i), (ii) and (iii) above). Since the publication of ICD10, many efforts have been made to align it with previous versions. This is still an on-going work, though some initial results can already be leveraged. Note that even though there is research on ICD9/10 alignment, this does not mean the problem can be easily solved. Expert mapping can be very subjective and debatable and is subject to long term scrutiny.

Basic text analysis techniques can be applied to extract computer understandable formulae out of such expert mapping. For instance, ICD9 and ICD10 codes can be used to establish the mapping while the reputation and authentication of data sources can be used to assign confidence value to the extracted mapping.

Some official websites publish such information as manual mapping/alignments done by domain experts. There is no restriction on what types of publications these should be. Normally, the extraction uses fixed, predefined linguistic patterns.

The outcome of such a module could be a triple: where ICD9 and ICD10 are the codes of different classification systems respectively and c is the aggregated confidence value that takes into account different sources (websites, research papers, etc.) to confirm or negate such a correspondence:

$$\langle \langle ICD9 \rangle, \langle ICD10 \rangle, c \rangle$$

One specific example uses the mapping in FIG. 3. An interim result may be that:
(291.0, F10.231, c1) or (291.0, F10.233, c2) each with an aggregated confidence value based on the sources used. This is then subject to further refinement by results from other modules as explained below, in module weight adjustment.

Syntactical mapping applies string similarity measures to compute the similarity of arbitrary ICD9/10 codes from the classifications themselves ((iv) above). Each ICD code is accompanied by code descriptions. Such a description can serve as a valuable clue for code alignment. In practice, widely used text similarity measures can be used, e.g. Simple Edit Distance, Jaro-Winkler Distance, etc. String similarity/distance software abounds and is known to the skilled person. In order to enrich/fine tune such measurements, ICD code description from different languages can also be used as part of the input. Meanwhile, the hierarchical structure of ICD code should be observed with parent description manifested at the child level. For instance, the description of ICD9 011.01 can be extended as:
infectious and parasitic diseases
  Tuberculosis
    Tuberculosis of lung, infiltrative, bacteriological or histological examination not done For each of the coding levels, there is a description associated with the short codes. When computing syntactical similarity, one can simple concatenate all the descriptions together to keep the taxonomy hierarchies (by adding lower level description to the upper level ones).

Much of such information is published in semi-structured data format, (some of which are even properly labelled with machine understandable tags in XML or RDF formats). An example could be:
Convert ICD-9-CM 291.0 to ICD-10-CM
ICD-9-CM 291.0 converts approximately to:
  2016 ICD-10-CM F10.231 Alcohol dependence with withdrawal delirium
  Note: approximate conversions between ICD-9-CM codes and ICD-10-CM codes may require clinical interpretation in order to determine the most appropriate conversion code(s) for your specific coding situation.
Source: 2016 ICD-10-CM General Equivalence Mappings.

Once concatenated together, the similarity of enhanced descriptions can already reflect some hierarchical semantics of diagnostic codes. One can then compute with the actually string similarity as the confidence of the mapping.

Meanwhile, other technology, such as hierarchy-based similarity propagation can be applied. For instance when two top level ICD codes (a and b) are aligned with a similarity score of x, the similarity of two sub-codes (a' and b') can be computed as:

$$sim(c_1, c_2) = x \cdot \frac{2 \cdot \max(dep(a), dep(b))}{dep(a') + dep(b')}$$

where dep( ) gives the depth of a code in the code hierarchy.

Figure 5:
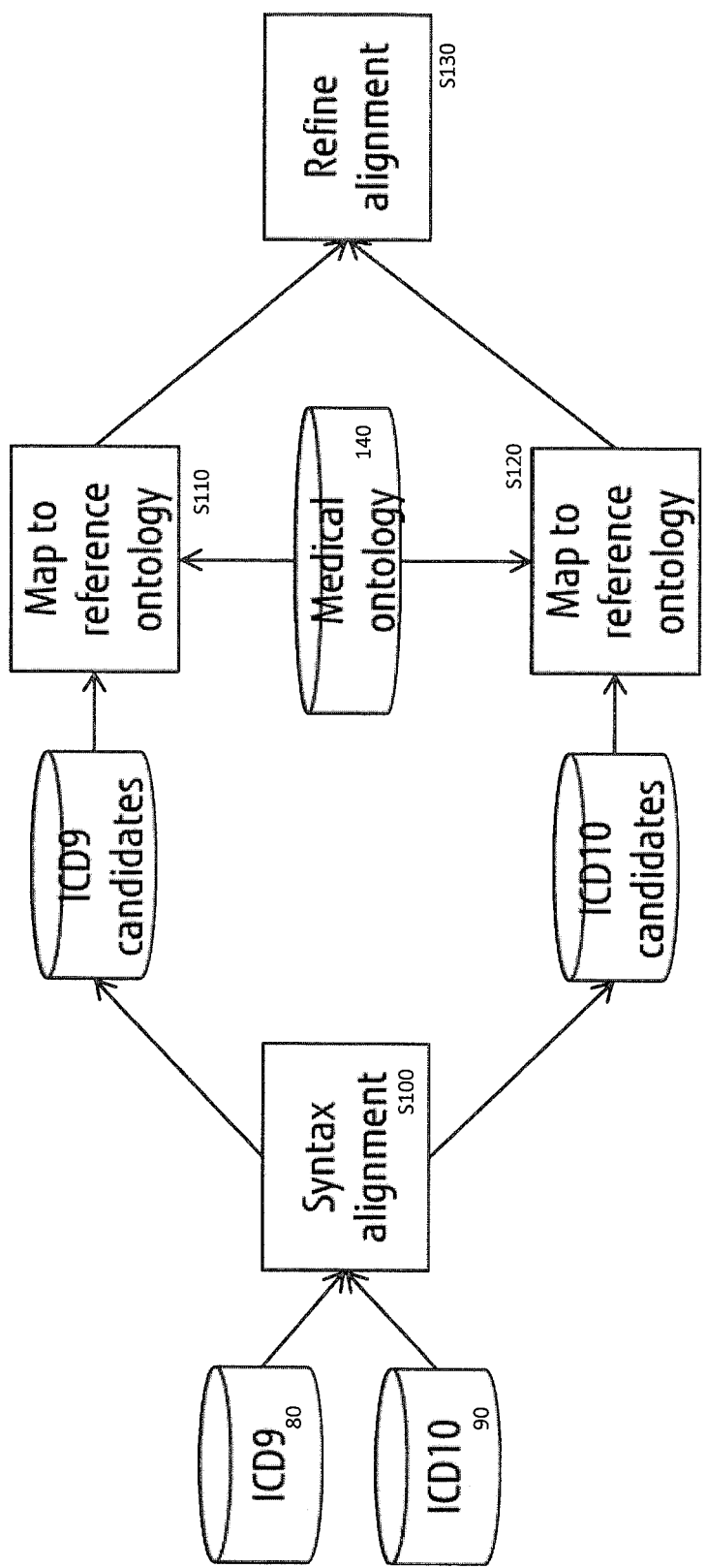
FIG. 5 is an example of how candidates obtained from syntactical alignment can be refined.
Figure 6:
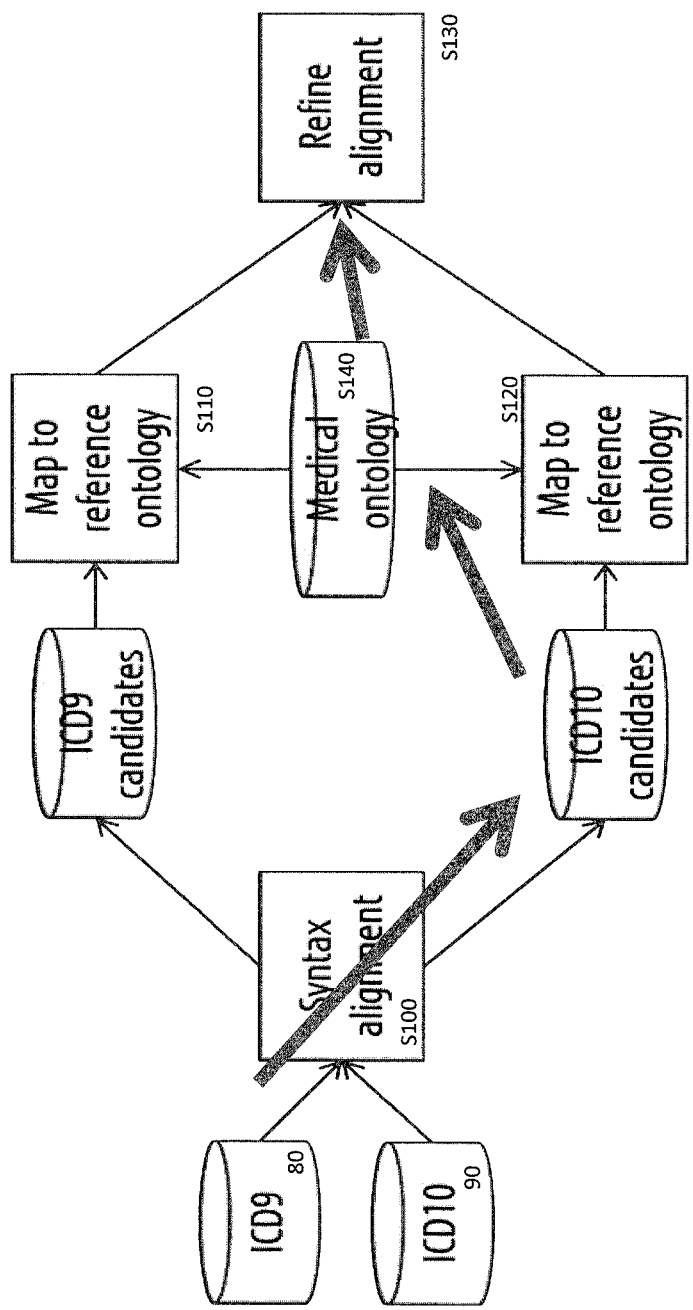
FIG. 6 is an example of a flow of processing in the FIG. 5 example.

Also, it is possible to leverage established ontology models (e.g. UMLS) for semantic enriched alignment. For instance, candidates obtained from syntactical alignment can be refined using ontological models as the interlingua or reference as shown in FIGS. 5 and 6.

In these diagrams, concepts in the medical ontology can serve as references to anchor diagnostic codes from both ICD versions.

An ICD9 code is subject to syntax alignments in step S100 against a selected set of ICD10 codes to screen out suitable candidates. These candidates are then subjected to ontology-based refinement in step S120 and then refined in S130. Equally, starting with an ICD10 code uses step S100 and ontology-based reinforcement in step S110 before step S13.

The output of this module can be an alignment with similarity where s is the similarity value:

$$\langle \langle ICD9 \rangle, \langle ICD10 \rangle, s \rangle$$

Case-based mapping draws similarity from existing patient cases that are annotated with both coding systems (listed as (v) above). As discussed previously, it is quite a common phenomenon that both coding systems coexist at one clinical institute. They are cases that were previously assigned an ICD9 code and are bearing ICD10 codes now. This can be due to the readmission or revisit of the patients with the same complaints or the patients may be undergoing review or re-evaluation of the same disorder episode. When the progression timeline of a patient can be established across all his/her visits together with the ICD code assigned at each visit, a case-based alignment can then be established. For instance, if a patient was classified as 011.01 during his/her first visit and later on has been assigned A15.0 using ICD10, evidence is said to be established between the alignment of ⟨⟨ ICD9: 011.01⟩, ⟨⟨ ICD10: A15.0⟩, p⟩. Confidence or probability level p of such alignment is established based on probability of such alignment, computed as the ratio of the number of cases confirming the particular alignment to the total number of cases annotated by the given ICD9 code. In this case, the probability is directional, i.e. for ICD9 to ICD10 mapping ⟨⟨ ICD9: 011.01⟩, ⟨ ICD10: A15.0⟩, p⟩ and for the reverse, ⟨⟨ ICD10: A15.0⟩, ⟨ ICD9: 011.01⟩, p'⟩, p=p' is not guaranteed.

For instance, if out of 100 cases annotated with ICD9 xxx, 60 of them are annotated with ICD10 A15.0, one can only conclude that there is a 0.6 mapping from ICD9xxx to ICD10 A15.0 but not vice versa.

The case-based mapping, however, is subject to several constraints. Both codes should be used against the same disorder or the same episode of a long term condition. Several heuristics can be used to guide the decision. Firstly, the duration of ICD9 and ICD10 codes should be preferably of the same hospital visits, e.g. with the same case reference or the same (electronic) medical record instance. Note that some LTC (Long Term Condition) cases can cover a long time span. Secondly, the codes should be assigned to similar complaints (symptoms). A symptom ontology may be of help in deciding whether a group of symptoms is compatible with another group.

It is possible to relax the restriction on single patient alignment to more sub-population based alignment, i.e. instead of anchoring alignment on one individual patient, a cohort of patients with the same demographic characteristics can be used. This is particular useful when individual patient data are scarce or skewed. Patient similarity can be computed using key characteristics such as age, gender, education background, economic background, key symptoms, etc. When two patients with similar demographic features and similar symptoms are annotated by ICD9 and ICD10 respectively, one can infer there is some kind of correspondence between the two codes.

B. Module Weight Adjustment

The alignment candidates as output from the individual mapping tools are aggregated by the module weight adjustment module, which will also decide which mapping tool will be more trustworthy. The weights are assigned equal initial values automatically or different initial values by domain experts. The weight is different from the confidence, probability, or similarity values in the previous section.

The weights can be adjusted in different ways, potentially using machine learning and starting from equal weight values for all three modules:

1. Weight adjustment can be based on end user feedback. Among all the candidates, human domain experts can choose the best one based on his/her personal preference. A population based decision can be established based on the simple majority-win principle or other vote aggregation methods, e.g. Borda count.
2. Weight can also be learnt using standard mapping, manually crafted by domain experts. The adjustment module can then decide which module should be assigned a higher weight than the others, based on how close the output of this module is with the expert choices.

C. Alignment Assignment Module

Figure 7:
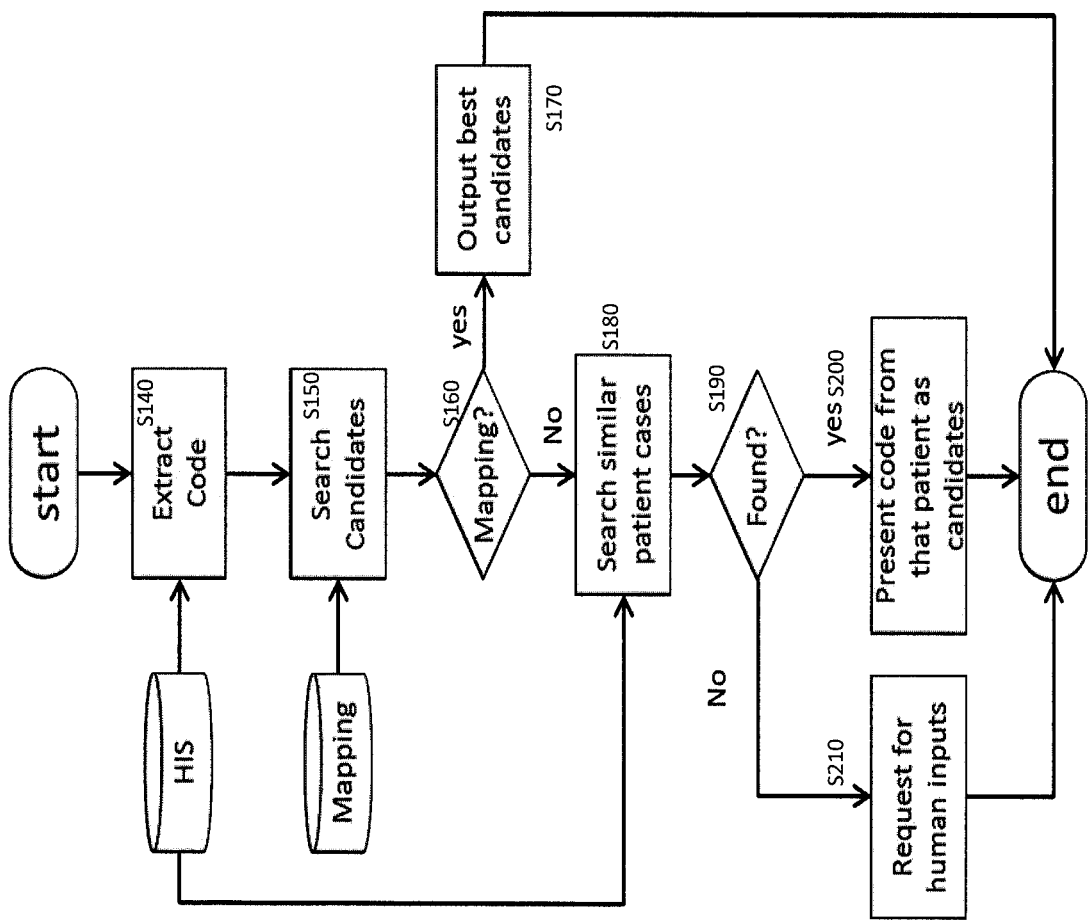
FIG. 7 is a flow diagram of processing in the alignment unit.

This module utilises the mapping from previous modules to apply to the patient records. It can apply a threshold to extract the most promising mapping candidate(s) for an input diagnostic code. This can be simply done as shown in FIG. 7 to create a mapping for cases in a HIS (Hospital Information System). This refers to patient data from hospital databases, mostly patient case data and annotation data.

First a code is extracted in step S140 and then the mapping used to search for candidates in S150. If there is at least one suitable mapping in S160, the best candidates are output in S170.

For input codes that do not have strong alignment candidates (no in S160), the system can first search for alternative solutions (S180). It will try to identify patients with similar situations (similar demographic characteristics and same symptoms or largely compatible symptoms (again based on a symptom ontology) and also with an ICD code. The assumption is that by identifying such similar a patient (yes in S190), his/her code can be "borrowed" in step S200 as the correspondence of ICD code from a different version. Similar patent cases can be stored either in memory or in a temporary disk file. Basically, "extract code" in step S140 also reads other information from patient cases. Such loaded cases are compared to those in HIS (the Hospital Information System).

If this process fails (no in S190), the system concludes that a correspondence cannot be found, hence human input is necessary.

The system creates a mapping methodology. Some dynamism is desired and a pre-computed full mapping from one coding system to another is static and thus not ideal. Also there is no one-to-one exact mapping. In these circumstances either the top-most ranking one or a group of candidates above a threshold weighting can be presented to the users (for instance, in the format of triples taken from an RDF graph of aligned (mapping) pairs of codes with confidence values averaged from the individual modules or listed separately).

A user query can take one of the following forms:

a. Retrieve all mappings: in this case, the current aggregated mapping (between all the codes in the two standards maybe together with the confidence value) will become the snapshot of alignment and delivered to users in either plain text format "icd9x, icd10y, confidence" or as the interactive User Interface (UI) shown in FIG. 3.
b. Retrieve individual mappings: in this case, the UI can display a patient record. Users can for instance right click on the given diagnostic code (e.g. an ICD9 code) to bring up the context menu and then select for instance "In ICD10 Code" menu item. For individual translation, other not-related code alignments can still be updated.

Figure 8:
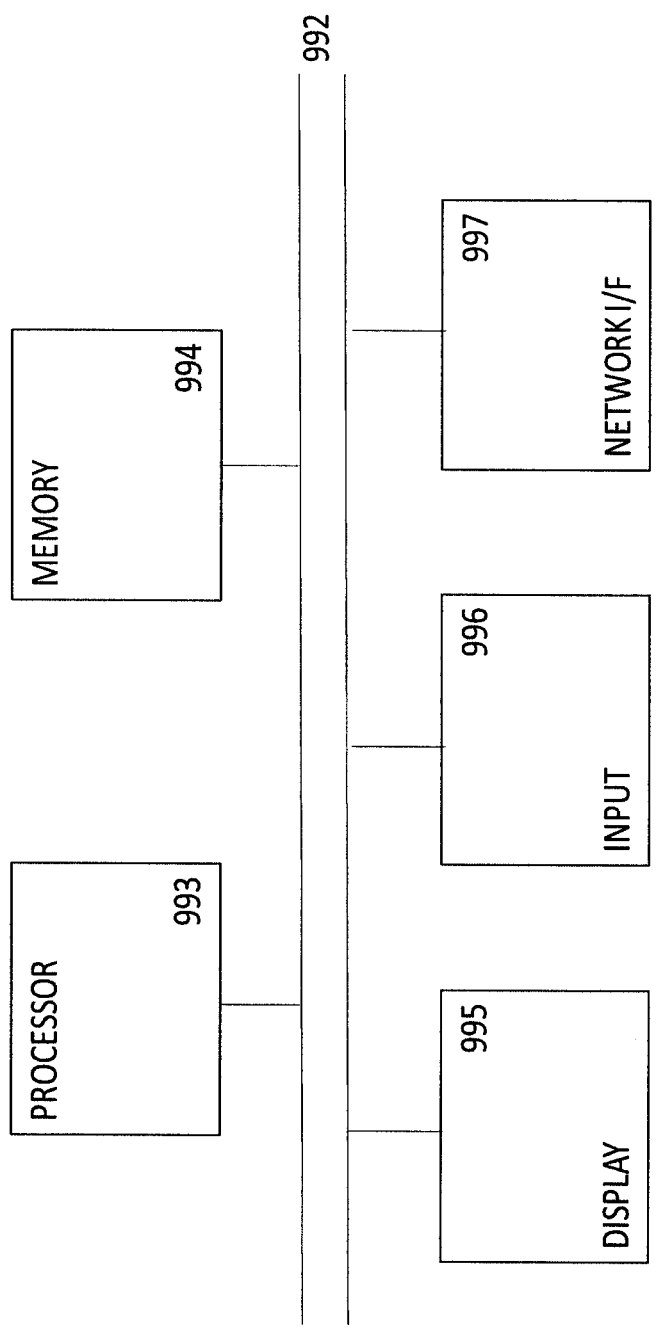
FIG. 8 is a diagram of suitable hardware for implementation of embodiments.

FIG. 8 is a block diagram of a computing device, such as a data storage server, which may be used to implement a method of mapping between code systems according to an embodiment. The computing device comprises a processor 993, and memory, 994 which allow it to carry out the functions of modules described herein. Optionally, the computing device also includes a network interface 997 for communication with other computing devices, for example with other computing devices of embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations and carry out the mapping of embodiments. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM)

or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the expert mapping module, syntactical mapping module, case-based mapping module, module weight adjustment unit and alignment unit described here and in the claims and shown in FIGS. 1 and 4. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device such as interim mappings or final mappings, with or without confidence values, or in graphical form as shown in FIG. 3. It may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and to provide connections to databases as shown in FIGS. 1 and 4. It is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The expert mapping ingestion module may comprise processing instructions stored on a portion of the memory 994, the processor 993 to execute the processing instructions, and a portion of the memory 994 to store interim results, for example in the form of triples with confidence values, during the execution of the processing instructions. The output of the expert mapping ingestion module, potentially as triples each embodying an established mapping and including any confidence values, may be stored on the memory 994 and/or on a connected storage unit, and may be transferred to the weight adjustment module.

The syntactical mapping module may comprise processing instructions stored on a portion of the memory 994, the processor 993 to execute the processing instructions, and a portion of the memory 994 to store interim results, for example in the form of triples with similarity values, during the execution of the processing instructions. The output of the syntactical module, potentially as triples each embodying a case-based mapping and including any similarity values, may be stored on the memory 994 and/or on a connected storage unit, and may be transferred to the weight adjustment module.

The case-based mapping module may comprise processing instructions stored on a portion of the memory 994, the processor 993 to execute the processing instructions, and a portion of the memory 994 to store interim results, for example in the form of triples with probability values, during the execution of the processing instructions. The output of the case-based mapping module, potentially as triples each embodying a case-based mapping and including any probability values, may be stored on the memory 994 and/or on a connected storage unit, and may be transferred to the weight adjustment module.

The module weight adjustment unit may comprise processing instructions stored on a portion of the memory 994, the processor 993 to execute the processing instructions, and a portion of the memory 994 to store triples and confidence/similarity/probability values from the modules during the execution of the processing instructions. The aggregated alignment candidates in the form of paired codes from the two standards and potentially a combined weighting may be stored on the memory 994 and/or on a connected storage unit, and may be transferred to the alignment unit.

The alignment unit may comprise processing instructions stored on a portion of the memory 994, the processor 993 to execute the processing instructions, and a portion of the memory 994 to store final mapping candidates during the execution of the processing instructions. The most promising mapping candidate may be stored on the memory 994 and/or on a connected storage unit, and may be displayed to the user on display 995.

Methods, such as the methods shown in FIGS. 2 and 7, may be carried out on a computing device such as that illustrated in FIG. 8. Such a computing device need not have every component illustrated in FIG. 8, and may be composed of a subset of those components. A method may be carried out by a single computing device in communication with one or more data storage servers via a network. The computing device may be a data storage itself storing the resultant mappings as well as interim results.

A method may be carried out by a plurality of computing devices operating in cooperation with one another. One or more of the plurality of computing devices may be a data storage server storing at least a portion of the resultant mapping.

Mappings among more than two coding systems can be obtained through pair-wise alignment. That is, for more than two coding system, the same procedure can be applied and we can assume the mappings among different coding systems are largely independent.

Key Features of Embodiments

Embodiments aim to provide comprehensive and evidence-based alignments between two coding systems, such as ICD9 and ICD10 systems that are largely used simultaneously in many clinical institutions. The system collects data from heterogeneous sources and extracts machine consumable knowledge to establish such alignments. Such alignments are kept up to date with two key technologies: extracting mappings on the fly from the latest online resources and online publications and emerging mappings from annotated patient cases/records as the usage-based alignment.

Key Benefits

Mapping between the two ICD coding systems is intrinsically complicated. This is true also for mappings/alignment between widely used coding standards beyond the medical domain. Embodiments present technologies that can deliver the following key benefits:

1. An up-to-date alignment between two (potentially more than two) widely used coding systems.
2. Alignment that consumes evidence from heterogeneous sources using usage semantics, syntactic features and established theories.

The method can be applied to the alignment of coding systems, as long as sufficient data sets annotated by the two different coding systems can be acquired to support the usage-based mapping (by the case-based mapping module).

The invention claimed is:

1. A system to align codes between two coding standards, comprising:
   a processor to implement an expert mapping module, a syntactical mapping module, a case-based mapping module, a module adjustment system, and an alignment system; and
   memory to store mappings provided by the expert mapping module, the syntactical mapping module, the case-based mapping module, the module adjustment system, and the alignment system;
   wherein:
     the expert mapping module is configured to collect established mappings between pairs of codes of two coding standards among coding standards, from an internet and/or from existing machine-readable publications, using text analysis techniques;
     the syntactical mapping module is configured to access the two coding standards including descriptions accompanying each code of the pairs of codes, and to find a syntactical similarity of the pairs of codes of the two coding standards using the descriptions to provide syntactical mappings, using text similarity measures;
     the case-based mapping module is configured to access existing cases annotated with both of the two coding standards, and to find case-based mappings between the pairs of codes of the two coding standards from the existing cases that are annotated with both coding standards, based on individual cases annotated with both coding standards and/or based on a cohort of cases annotated with both coding standards having a defined characteristic of population of cases, each population case being annotated with one of the two coding standards;
     the module adjustment system is configured to aggregate mappings from the modules by combining the mappings from the expert mapping module, the syntactical mapping module and the case-based mapping module; and
     the alignment system is configured to accept input of codes from one of the coding standards and to use the aggregated mappings from the module adjustment system to extract a suitable mapping from the input codes to a code of another coding standard, from among extracted mapping candidates indicatable as most promising mapping candidates.

2. A system according to claim 1, wherein the expert mapping module is configured to provide a confidence value for an established mapping among the established mappings to reflect a different source which establish the established mapping.

3. A system according to claim 1, wherein the syntactical mapping module is configured to provide a similarity value for a syntactical mapping to find the syntactical similarity in form of string similarity and/or to use an ontology to serve as a reference for the descriptions for each code to find the syntactical similarity.

4. A system according to claim 1, wherein the syntactical mapping module is configured to provide a similarity value for a syntactical mapping to find the syntactical similarity in form of hierarchical similarity and/or to use an ontology to serve as a reference for the descriptions for each code to find the syntactical similarity.

5. A system according to claim 1, wherein the case-based mapping module is configured to provide a probability value for a case-based mapping to reflect a ratio of cases confirming mapping of a code from a first of the two coding standards to a code of a second of the two coding standards to a total number of cases annotated with the code in the first of the coding standards.

6. A system according to claim 1, wherein one of the expert mapping module, the syntactical mapping module, and the case-based mapping module, periodically update a mapping of each module, when stored metadata differs from external data source metadata.

7. A system according to claim 1, wherein the module adjustment system is configured to accumulate any confidence, similarity and probability values.

8. A system according to claim 1, wherein the module adjustment system is configured to assign a module weight to a mapping from each module.

9. A system according to claim 8, wherein the module weight is based on end user feedback, from domain experts, and/or based on comparison of individual outputs of modules to a standard mapping.

10. A system according to claim 1, wherein the alignment module is configured to accept input of a single code from a current case to extract the suitable mapping to a corresponding code.

11. A system according to claim 10, wherein when no suitable mapping is found, the alignment module is configured to search for a candidate mapping belonging to previous cases which are similar to a current case and to present codes from similar previous cases as candidate codes for the input of codes.

12. A system according to claim 1, wherein the alignment module is configured to apply a threshold to any one or combination of: a module weight, confidence value, similarity value, or probability value, of the extracted mapping candidates to extract the suitable mapping.

13. A method of aligning codes between two coding standards, comprising:
   collecting established mappings between pairs of codes of two coding standards among coding standards, from an internet and from existing machine-readable publications, using text analysis techniques;
   accessing the two coding standards including descriptions accompanying each code of the pairs of codes, and finding a syntactical similarity of the pairs of codes of the two coding standards using the descriptions to provide syntactical mappings, using text similarity measures;
   accessing existing cases annotated with both of the two coding standards, and finding any case-based mappings between pairs of codes of the two coding standards from the existing cases that are annotated with both coding standards, based on individual cases annotated with both coding standards and/or based on a cohort of cases annotated with both coding standards having a defined characteristic of population of cases, each population case being annotated with one of the two coding standards;
   aggregating the mappings; and accepting input of codes from one of the two coding standards and using the aggregated mappings to extract a suitable mapping from the input codes to a code of another coding standard, from among extracted mapping candidates indicatable as most promising mapping candidates.

14. A non-transitory computer-readable storage medium storing a computer program which when executed on a computing device carries out a method of aligning codes between two coding standards, the method comprising:

collecting established mappings between pairs of codes of two coding standards among coding standards, in form of theoretically established mappings between the pairs of codes of the two coding standards from an internet and from existing machine-readable publications, using text analysis techniques;

accessing the two coding standards including descriptions accompanying each code of the pairs of codes, and finding a syntactical similarity of pairs of codes of the two coding standards using the descriptions to provide syntactical mappings, using text similarity measures;

accessing existing cases annotated with both of the two coding standards, and finding any case-based mappings between pairs of codes of the two coding standards from the existing cases that are annotated with both coding standards, based on individual cases annotated with both coding standards and/or based on a cohort of cases annotated with both coding standards having a defined characteristic of population of cases, each population case being annotated with one of the two coding standards;

aggregating the mappings by combining the mappings from the expert mapping module, the syntactical mapping module and the case-based mapping module; and accepting input of codes from one of the coding standards and using the aggregated mappings to extract a suitable mapping from the input codes to a code of another coding standard, from among extracted mapping candidates indicatable as most promising mapping candidates.

* * * * *